United States Patent [19]

Aeschliman

[11] 4,120,110
[45] Oct. 17, 1978

[54] DUCK DECOY

[76] Inventor: Anthony Aeschliman, Berkley St., Berkley, Mass. 02780

[21] Appl. No.: 768,482

[22] Filed: Feb. 14, 1977

[51] Int. Cl.² ............................................. A01M 31/06
[52] U.S. Cl. ........................................................... 43/3
[58] Field of Search ............................................. 43/2, 3

[56] References Cited

U.S. PATENT DOCUMENTS

| | | | |
|---|---|---|---|
| 970,003 | 9/1910 | Wethall | 43/3 |
| 1,746,640 | 2/1930 | Emoff | 43/3 |
| 2,246,574 | 6/1941 | Coe | 43/3 |
| 2,952,090 | 9/1960 | Pittenger | 43/3 |

FOREIGN PATENT DOCUMENTS 2,806 of 1884 United Kingdom ............................ 43/3

OTHER PUBLICATIONS

*Popular Science Monthly*, "Silhouette Decoys", Sep. 1936, pp. 59–60.

*Primary Examiner*—N. P. Godici
*Attorney, Agent, or Firm*—Salter & Michaelson

[57] ABSTRACT

A decoy assembly having a plurality of decoy members of generally flat configuration shaped in profile to resemble ducks or other game species and including a support which is adapted for movement between closed, collapsed and open, expanded positions. At least some of the decoy members are connected to the upper surface of the support for rotation with respect thereto about a vertical axis, so that when the decoy assembly is in use, i.e. floating on a body of water, the decoy members may assume varying attitudes within overall position patterns so as to produce a more natural appearance of the assembly.

9 Claims, 5 Drawing Figures

DUCK DECOY

BACKGROUND OF THE INVENTION

The present invention relates to duck decoys and particularly to a decoy assembly in which a plurality of decoy members are mounted to and used in conjunction with a support member, which in turn is movable from a closed, collapsed storage or carrying position to an expanded use position. Decoys and particularly duck decoy assemblies which expand from a collapsed storage position to an expanded use position are well known and generally include those in which the several decoy members thereof assume a generally flat configuration i.e. the duck or other game specie is outlined in profile. Other prior known decoy assemblies include three dimensional decoy members which more closely resemble the natural shape of the species. Generally the profile type permit assembly collapse, that is, both the decoy members and their support fold or otherwise collapse as a unit for ease in storage or carrying from place to place, whereas the three-dimensional type generally necessitate the separation of the decoy members from the support member for transport or storage. Representative of profile type assemblies are those constructions shown in U.S. Pat. Nos. 677,118; issued June 25, 1901; 694,732, issued Mar. 4, 1902; 710,433, issued Oct. 7, 1902; and 2,952,090, issued Sept. 13, 1960, while patents representative of decoy assemblies utilizing three-dimensional decoys are 970,003, issued Sept. 13, 1910; 2,246,574, issued June 24, 1941; 2,256,616, issued Sept. 23, 1941, and 2,616,200, issued Nov. 4, 1952.

SUMMARY OF THE INVENTION

The present invention is particularly directed to a novel profile type decoy assembly construction.

Inasmuch as it is a desirable feature in duck or other specie decoy assemblies of the type under consideration to present the decoy members in a natural appearing pattern with respect to each other, it is a primary object of the present invention to provide a collapsible decoy assembly in which a plurality of decoy members are assembled upon a support in an overall pattern which the game species under consideration would be likely to form and which enables the individual decoy members within such pattern to move with respect to each other to form pattern variances such as those which might be assumed dependent on varying environmental conditions.

A further object of the present invention is the provision of a decoy assembly in which a plurality of decoy members are positioned within a support in an overall pattern and in which at least some of such decoy members may be rotatably moved with respect to each other within such overall pattern.

A still further object of the present invention is the provision of a decoy assembly of the immediately aforementioned type in which the support therefor is not only expandable between open use and closed storage or transport positions, but which is adapted to assume varying expanded positions under use so as to vary the overall pattern of the decoy members with respect to each other.

Another object of the present invention is the provision of a decoy assembly including a plurality of decoy members positioned with respect to a support, which members are easily interchangeable to enable the decoy assembly to be used for a variety of game species.

A still further object of the invention is the provision of a decoy assembly which is not only simple in construction but which is furthermore easy to handle both in use and storage thereof including its setup under field conditions.

These and other objects of the invention are accomplished by the provision of a decoy assembly in which a plurality of decoy members each including a substantially flat body having a profile in the form of a particular game specie are mounted in an overall pattern to the upper surface of a floating support in the form of a lazy tong unit having a series of criss-cross elongated elements or slats, and wherein at least some of said decoy members are freely pivotable about individual upright axes with respect to said support.

Other objects, features and advantages of the invention shall become apparent as the description thereof proceeds when considered in connection with the accompanying illustrative drawings.

DESCRIPTION OF THE DRAWING

In the drawings which illustrate the best mode presently contemplated for carrying out the present invention.

DESCRIPTION OF THE INVENTION

Figure 1:
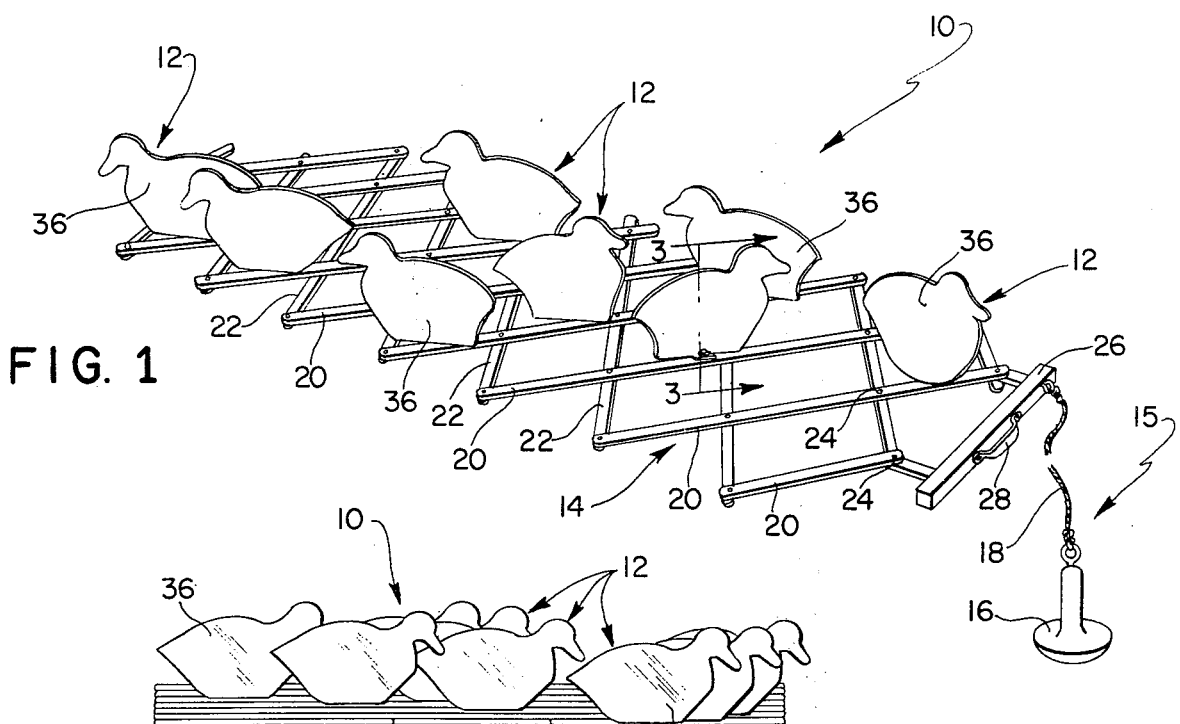
FIG. 1 is a perspective view of the duck decoy assembly of the present invention in expanded use position, wherein the individual decoy members are movable about vertical axes with respect to each other within varying overall patterns.

Referring now to the drawing and particularly FIG. 1 thereof, a decoy assembly generally indicated at 10 is illustrated and includes a plurality of decoy members generally indicated at 12 mounted upon a support generally indicated at 14 in an overall pattern. The decoy assembly 10 has particlaur application in the hunting of ducks, and for this purpose is designed to float upon the surface of a body of water within the confines of a localized area as controlled by an anchor assembly generally indicated at 15. The anchor assembly 15 includes an anchor 16 and a line 18 which is suitably interconnected between the anchor 16 and the support 14 in any suitable manner.

Figure 2:
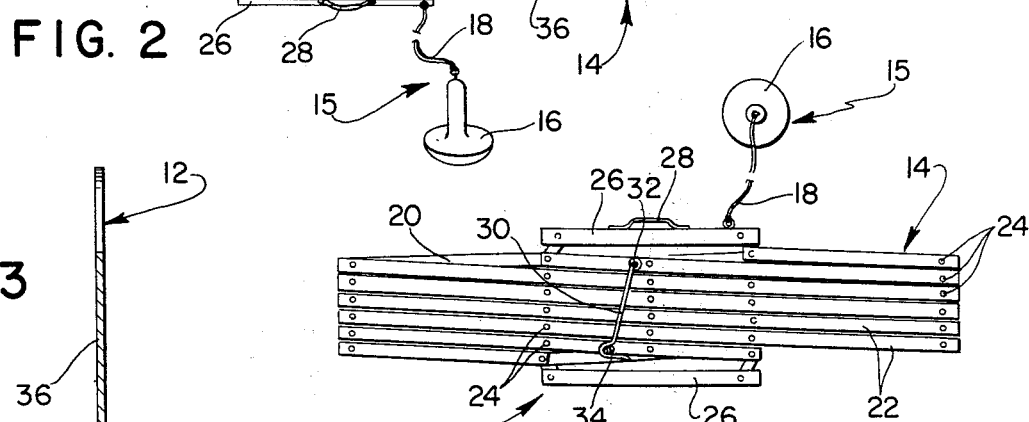
FIG. 2 is a side or end elevational view of the duck decoy in FIG. 1 but in a closed collapsed storage or transport position.
Figure 5:
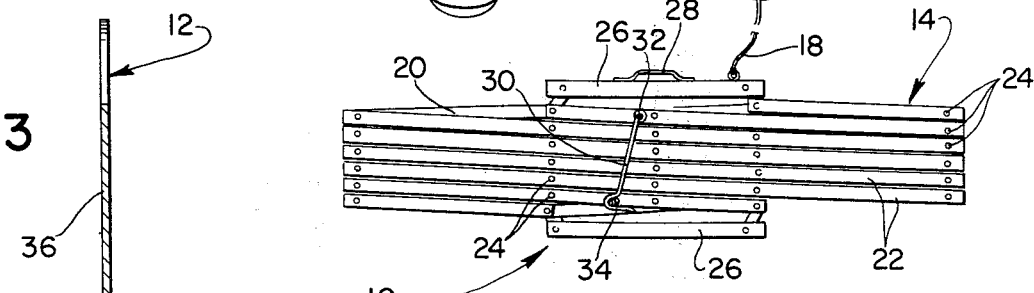
FIG. 5 is a bottom plan view of the decoy assembly illustrated in FIG. 2, showing in particular the means for maintaining the support in the closed collapsed position.
Figure 4:
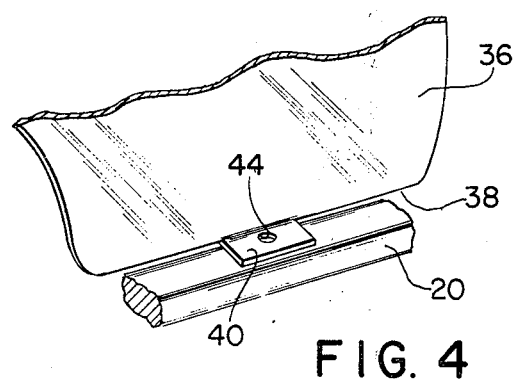
FIG. 4 is a partial perspective view showing a bottom portion of a decoy member and particularly the outwardly extending tab which in part comprises the connection means between the support and decoy members.

The support 14 is in the form of a lazy-tong unit having a plurality of a first set of elongated, relatively long, narrow, thin wooden slats or elements 20. The elements 20 are located in overlying, criss-cross fashion with respect to a second set of similar slats or elements 22. At least some and preferably each of the elements 20 is pivotally connected at spaced points to underlying portions of the elements 22 by pin connections 24. The elements 20 in effect form an upper surface while the underlying elements 22 form a lower surface of the support 14. Each of the elements 20, 22 in their respective first and second sets thereof are aligned in generally parallel relationship to each other and movable between a collapsed position where the elements of each set thereof are in relatively close adjacent position to each other as shown in FIG. 2 to an expanded use position as shown in FIG. 1 wherein such elements are separated from each other a distance dependent upon the lateral expansion of the lazy-tong unit itself. Shortened end portions 26 on either end of the lazy-tong unit are provided so as to limit such lateral extension and form a convenient position from which the anchor means 15 may be interconnected and for the mounting of a handle 28 which in turn serves as a means by which the assembly 10 may be moved from place-to-place. As best shown in FIG. 5, a latch means in the form of a hook 30 is pivotally connected by a screw 32 to one of the underlying elements 22 and spans several of the elements 22 for interconnection with a post 34, and thus serve to maintain the lazy-tong unit in a closed position.

Figure 3:
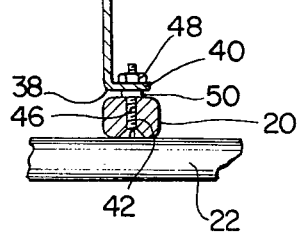
FIG. 3 is a sectional view on an enlarged scale taken through the line 3—3 of FIG. 1 and showing the details of the pivotal connection between one of the decoy members and the support.

Each of the decoy members 12 includes a generally flat body portion 36 having in profile the shape of the particular game species desired to be attracted, i.e. in the form of a duck or the like. At least some and generally all of the decoy members 12 are mounted to the upper surface of the support 14 as by the positioning indicated in FIG. 3 to selected upper slats 20 in an overall or predetermined pattern. The pattern, of course, may be varied by positioning one or more decoy members 12 on adjacent slats 20 so as to arrange the decoys in varying configurations which the particular game species under consideration might assume in its natural environment. The body 36 of each decoy member 12 further includes a lower terminal edge 38 on which a laterally extending tab 40 is formed. The tab 40 is adapted for general face-to-face disposition in longitudinal orientation with the upper surface of a portion of one of the slats 20. Furthermore, selected slats 20 are provided with one or more openings 42 with which an opening 44 in the tab 40 is aligned. A connecting member in the form of a flathead bolt 46 is mounted flush with the lower surface of a slat 20 so as to extend through the openings 42 and 44, and projects upwardly of the tab 40 for receipt of a threaded nut 48 so as to connect decoy member 12 to a selected portion of the slat 20 in an overall or predetermined pattern and which enables rotational movement of the decoy member 12 about a vertical pivot formed by the shaft of the bolt 46. It should be brought out that the tightness of the connection between the decoys and the support may be varied by rotation of the shaft 46 of each bolt or its threaded retaining nut 48 so as to vary the ease in which a decoy 12 may rotate with respect to the support 14. For this purpose one or more washer elements 50 is inserted between the respective upper surface of the slat 20 and the lower surface of the tab 40 of each decoy. It should also be apparent that the above described connection means enable portions of the underlying elongated elements or slats 22 to slidably move with respect to the upper elements 20 thereof and thus enable the upper and lower surface portions of the support 14 to move in accordian-like fashion as intended.

The body portion 36 of the decoys 12 may be formed of any suitable material generally having the properties of being generally light and suitable for exposure in salt water marshes and the like. Aluminum sheet approximately one-eighth inch thick and painted on both sides thereof to resemble a duck or other game species has been found particularly suitable for this purpose. Inasmuch as it is desirable that the overall decoy assembly 10 float, the support 14 as above indicated is preferably formed of wood and the interrelationship between the composite weight of the decoys 12 in conjunction with the buoyant effect produced by the support 14 is such that the overall assembly 10 will float upon a body of water with the support portions 14 including the connecting means between the decoys and the support slightly beneath the surface of the water so that only the upper portions of decoy members 36 project thereabove so as to more naturally resemble a group of game species in assembled activity. In such floating use position, it should also be pointed out that the lazy tong unit is free to move in a somewhat undulating fashion by the action of the tides and water current, wherein the actual effect of ducks floating on water is realistically achieved. As hereinabove described, all of the decoys 12 are pivotal to a selected position so that the effect of the positioning of all of the decoys is to achieve a natural and realistic setting. Both of the aforementioned positioning effects enable the decoy assembly 10 to assume more natural movement and enhance its operation as a game species attractant. It is further emphasized that the decoy assembly is easily moved to an expanded or collapsed position in the field, and in the collapsed condition presents an easily storable construction when not in use.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A decoy assembly comprising a longitudinally oriented support having upper and lower surfaces adapted for relative respective movement between collapsed and laterally expanded positions, a plurality of decoy members each including a substantially flat body having a profile in the form of a duck or the like, said decoy members being attached in an upright attitude to portions of said upper surface only and in an overall pattern with at least some of said members being laterally displaced from each other, at least some of said members being pivotal about individual upright axes with respect to said support, whereby said decoy members are longitudinally aligned in closely spaced lateral relationship in said collapsed position and pivotal about said upper surface in said expanded position so as to assume varying rotational positions with respect to said overall pattern, said support being a lazy-tong unit including a first set of substantially parallel longitudinally oriented laterally spaced elongated elements defining said upper surface and a second set of substantially parallel longitudinally oriented laterally spaced elongated elements underlying said first set thereof and defining said lower surface, said sets of elements crisscrossing over one another with at least some vertically adjacent elements in said respective sets thereof being pivotally interconnected to each other so that said support may be moved in an overall single accordian fashion motion between said collapsed and expanded positions, while maintaining said parallel disposition of the elements of respective sets thereof in parallel disposition to each other, said assembly being adapted to float in use upon a body of water and said lazy-tong unit enabling separate longitudinally spaced portions thereof to upwardly flex from the unit as a whole so as to enable an undulating movement responsive to wavelike motion of said body of water to occur in said assembly while floating.

2. The decoy assembly of claim 1, including means associated with said body for pivotally connecting said member to one of said elements in said first set thereof.

3. The decoy assembly of claim 2, said connecting means including a tab outwardly extending from a lower terminal edge of said body and positioned in face-to-face rotatable relationship with an upper surface portion of on of said first set of elements about a fixed vertical axis.

4. The decoy assembly of claim 3, said elements being relatively long, narrow, thin wooden slats.

5. The decoy assembly of claim 4, said body of a relatively light material such as aluminum wherein said assembly is adapted to float in water with the upper surface thereof slightly below the water line so as to conceal said attachment means.

6. The decoy assembly of claim 4, said means for connecting said body to said element further including an opening in said element aligned with an opening in said tab, a threaded element having a head substantially flush with the bottom surface of said element, and a threaded shaft disposed within said element opening and projecting through said tab opening, and means operatively associated with said tab for engaging said threaded shaft, wherein vertical movement of said shaft adjusts the rotation permitting connecting force between said element and said body.

7. The decoy assembly of claim 3, including locking means comprising a latch laterally spanning a substantial number of said elements for maintaining said assembly in its collapsed position.

8. The decoy assembly of claim 6, including anchor means for relatively positioning said assembly within a body of water.

9. The decoy assembly of claim 1, said lazy-tong unit being randomly movable between various longitudinally expanded and contracted support attitudes while floating by the action of said body of water so as to simultaneously modify the lateral and longitudinal relative positions of said decoy members to vary said overall position.

* * * * *